(12) United States Patent
Binothman

(10) Patent No.: US 9,089,112 B2
(45) Date of Patent: Jul. 28, 2015

(54) VERSATILE PERCHING BLOCK

(71) Applicant: Albara M. Binothman, Portland, OR (US)

(72) Inventor: Albara M. Binothman, Portland, OR (US)

( * ) Notice: Subject to any disclaimer, the term of this patent is extended or adjusted under 35 U.S.C. 154(b) by 67 days.

(21) Appl. No.: 13/892,779

(22) Filed: May 13, 2013

(65) Prior Publication Data
US 2014/0331935 A1 Nov. 13, 2014

(51) Int. Cl.
*A01K 31/12* (2006.01)
*A01K 5/01* (2006.01)

(52) U.S. Cl.
CPC .............. *A01K 31/12* (2013.01); *A01K 5/0114* (2013.01)

(58) Field of Classification Search
CPC ...................................................... A01K 31/12
USPC ............... 119/428, 429, 531, 537, 28.5, 57.8, 119/61.5, 61.57
See application file for complete search history.

(56) References Cited

U.S. PATENT DOCUMENTS

| | | | | |
|---|---|---|---|---|
| 3,301,217 A * | 1/1967 | Prowinsky | ................... | 119/57.9 |
| 4,497,278 A * | 2/1985 | Balder et al. | ................... | 119/537 |
| 5,148,626 A * | 9/1992 | Haake, Sr. | ....................... | 43/121 |
| 5,218,927 A * | 6/1993 | Addams | ......................... | 119/537 |
| 5,501,176 A * | 3/1996 | Tully | .......................... | 119/61.57 |
| 5,775,256 A | 7/1998 | Henshaw | | |
| D420,472 S * | 2/2000 | Dellasandro et al. | ........ | D30/119 |
| 6,311,641 B1 * | 11/2001 | Johnson | ....................... | 119/57.8 |
| 6,354,244 B1 | 3/2002 | Green | | |
| D469,586 S * | 1/2003 | McGinn et al. | .............. | D30/119 |
| 8,006,946 B2 | 8/2011 | Bonnema | | |
| 2002/0195061 A1* | 12/2002 | Sonnek | ......................... | 119/428 |
| 2010/0175635 A1* | 7/2010 | Martinez | ....................... | 119/713 |
| 2011/0041772 A1* | 2/2011 | Hargrove | .................... | 119/61.57 |

OTHER PUBLICATIONS

Arab Block Perch, "8" Arab Block Perch Indoor/Outdoor Interchangable Limited Stock, http://www.rhuallanraptors.com/gallery/main.php?g2_itemId=1138, Mar. 5, 2010.
Katherine Kelly, "How to Make a Birdfeeder from Plastic Champagne Glasses", http://www.essortment.com/make-birdfeeder-plastic-champagne-glasses-118438.html, 2011.

* cited by examiner

*Primary Examiner* — Rob Swiatek
*Assistant Examiner* — Lisa Tsang
(74) *Attorney, Agent, or Firm* — Oblon, McClelland, Maier & Neustadt, L.L.P.

(57) ABSTRACT

A versatile perching block comprising a shaft with a top end and a bottom end, a plurality of head portions connectable to the top end, and a plurality of bases connectable to the bottom end. The perching block is part of a system that includes interchangeable parts, including interchangeable head portions and interchangeable basis.

3 Claims, 2 Drawing Sheets

VERSATILE PERCHING BLOCK

CROSS REFERENCE TO RELATED APPLICATIONS

The present application contains subject matter related to that described in commonly owned Saudi application No. GC 2010-17493, filed Oct. 28, 2010, at the Saudi Arabian General Directorate of Industrial Property Filing and Granting, the contents of which being incorporated herein in its entirety.

GRANT OF NON-EXCLUSIVE RIGHT

This application was prepared with financial support from the Saudi Arabian Cultural Mission, and in consideration therefore the present inventor has granted The Kingdom of Saudi Arabia a non-exclusive right to practice the present invention.

BACKGROUND

1. Field of the Disclosure

This disclosure relates to a versatile perching block, and more specifically, to a versatile perching block with removable and/or interchangeable portions.

2. Description of the Related Art

The "background" description provided herein is for the purpose of generally presenting the context of the disclosure. Work of the presently named inventor, to the extent it is described in this background section, as well as aspects of the description which may not otherwise qualify as prior art at the time of filing, are neither expressly nor impliedly admitted as prior art against the present invention.

Conventional perching blocks, usually used by breeders or at the zoo, have a head portion with a fixed size and shape. There are disadvantages in using such conventional perching block. The fixed shape of the head portion may cause tension in the ligaments of birds as the ligaments are in a certain position over an extended period of time. Additionally, the fixed head portion may not be sanitary as it may not be readily washable. A fixed head portion may also not accommodate different bird types, thereby limiting the use of the conventional perching block.

SUMMARY

This disclosure describes a versatile perching block.

According to one embodiment, there is provided a versatile perching block comprising a shaft with a top end and a bottom end, a plurality of top portions connectable to the top end, and a plurality of bottom portions connectable to the bottom end.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1A:
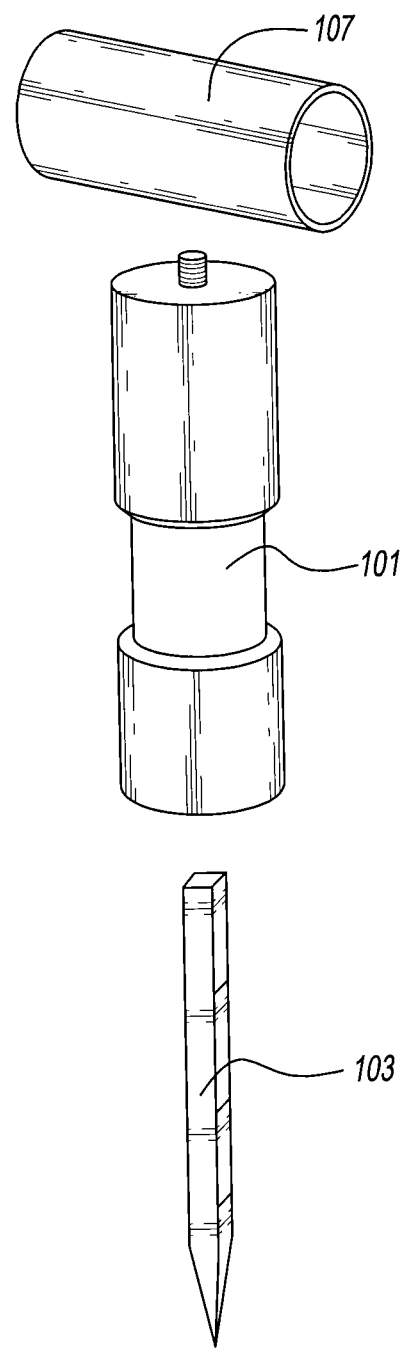
FIGS. 1A and 1B are illustrative views of exemplary embodiments of a versatile perching block.
Figure 1B:
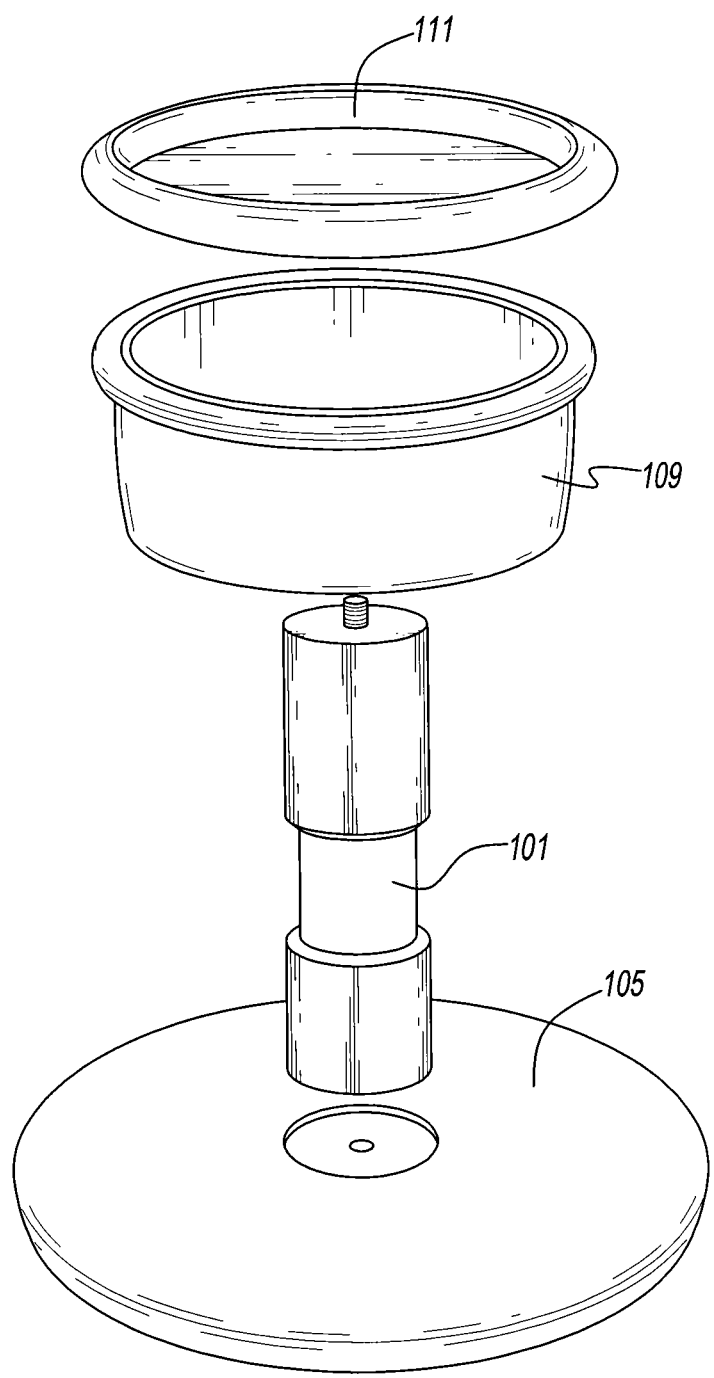

Referring now to the drawings, wherein like reference numerals designate identical or corresponding parts throughout the several views, FIGS. 1A and 1B are illustrative views of exemplary embodiments of a versatile perching block. According to these embodiments, the versatile perching block includes a shaft 101. A stake 103 or a flat base 105 may be interchangeably connected to a lower end of the shaft 101. A bar perch 107 or a block perch 109 may be interchangeably connected to an upper end of the shaft 101.

According to one embodiment, the block perch 109 may be a container with a lid 111 and may further include a lid 111. The lid 111 may be placed on the container during a bird's feeding time or when applying ointment to the bird.

According to one embodiment, the block perch 109 may be filled with sand or gravel or other similar granular material.

According to one embodiment, the stake 103, the flat base 105, the bar perch 107, or the block perch 109 may be connectable to the shaft 101 via a screw mechanism.

According to one embodiment, the shaft 101, the stake 103, the flat base 105, the bar perch 107, or the block perch 109 may be made of a material that is washable.

The disclosed embodiments provide a versatile perching block with an interchangeable head portion to help reduce tension on a birds' ligaments by changing the shape of the head portion from time to time.

The disclosed embodiments provide a versatile perching block with an interchangeable and washable head portion to help in cleaning the perching block.

The disclosed embodiments provide a versatile perching block with an interchangeable where each head portion is adapted for a certain bird type or size, thereby eliminating the need for different perching blocks for different bird types or sizes.

The disclosed embodiments provide a versatile perching block with an interchangeable base so the perching block may be used indoor and outdoor and on hard and soft ground.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

The invention claimed is:

1. A perching system consisting of:
   a shaft with a top end, a bottom end and a center portion having a single diameter smaller than another single diameter of the top end and the bottom end, a length of the top end being longer than the center portion of the shaft and longer than the bottom end;
   a plurality of interchangeable head portions each interchangeably connectable to the top end, the plurality of interchangeable head portions including a block perch and a bar perch, the block perch being a hollow container with a round cross-section and including a lid that covers an interior portion of the hollow container, the bar perch being tubular, the top end of the shaft having a threaded member extending therefrom so that the block perch and the bar perch are each detachably attachable to the shaft via the threaded member; and
   a plurality of interchangeable bases each interchangeably connectable to the bottom end of the shaft, the plurality of interchangeable bases including a stake and a flat base, a top of the stake having a square cross section that is capable of being received into the bottom end of the shaft, a bottom end of the stake being tapered to a sharp point, the flat base having a bottom side configured to rest on a supporting surface, and a top side that has a recessed portion configured to match an outer diameter of the bottom end of the shaft so that the recessed portion of the flat base supports the shaft.

2. The perching system of claim 1, wherein the block perch includes a container.

3. The perching system of claim 2, wherein the container is filled with one or more of sand or gravel.

* * * * *